United States Patent [19]

Kishi et al.

[11] Patent Number: 4,693,943
[45] Date of Patent: Sep. 15, 1987

[54] MAGNETOOPTICAL RECORDING MEDIUM

[75] Inventors: Hiroyoshi Kishi, Tokyo; Masaaki Matsushima, Machida, both of Japan

[73] Assignee: Canon Kabushiki Kaisha, Tokyo, Japan

[21] Appl. No.: 671,978

[22] Filed: Nov. 16, 1984

Related U.S. Application Data

[63] Continuation-in-part of Ser. No. 491,300, May 1, 1983, abandoned, and Ser. No. 492,634, May 9, 1983, abandoned.

[30] Foreign Application Priority Data

May 10, 1982 [JP] Japan .................................. 57-77677
May 17, 1982 [JP] Japan .................................. 57-82653
Mar. 16, 1983 [JP] Japan .................................. 58-45035

[51] Int. Cl.$^4$ ............................................. G11B 7/24
[52] U.S. Cl. .................................... 428/678; 428/681; 428/928; 428/694; 428/900
[58] Field of Search ............... 428/694, 900, 928, 681, 428/678, 685; 365/122; 360/131, 135

[56] References Cited

U.S. PATENT DOCUMENTS 3,474,428 10/1969 Nelson et al. ................ 340/174.1 M

FOREIGN PATENT DOCUMENTS 2071696 9/1981 United Kingdom .

OTHER PUBLICATIONS

Aratani et al, Journal of Applied Physics 57(1) 1985, p. 3903.
Taylor et al, Journal of Applied Physics 48(1) 1977, p. 358.
Luborsky et al, Journal of Applied Physics 49(3) 1978, p. 1768.

Primary Examiner—George F. Lesmes
Assistant Examiner—William M. Atkinson
Attorney, Agent, or Firm—Fitzpatrick, Cella, Harper & Scinto

[57] ABSTRACT

A magnetooptical recording medium of an amorphous magnetic alloy film of a composition which as an axis of easy magnetization in a direction perpendicular to the film surface represented by I, II or III:

$$[(GdTb)_{1-y}(FeCo)_y]_{1-p}Cr_p \qquad (I)$$

wherein $0.5 \leq y \leq 0.9$ and $0.001 \leq p \leq 0.3$;

$$(GdTbFe)_{1-(p+q)}Cr_pX_q \qquad (II)$$

wherein X can be either silicon or aluminum; $p \geq 0.001$, $q \geq 0.001$ and $(p+q) \leq 0.3$; or $$[(GdTb)_{1-y}(FeCo)_y]_{1-(p+q)}Cr_pX_q \qquad (III)$$

wherein X can be either silicon or aluminum, $0.5 \leq y \leq 0.9$, $p > 0.001$, $q \geq 0.001$ and $(p+q) \leq 0.3$.

5 Claims, 1 Drawing Figure

MAGNETOOPTICAL RECORDING MEDIUM

CROSS REFERENCE TO RELATED APPLICATIONS

This application is a continuation-in-part of pending parent applications Ser. No. 491,300, filed May 1, 1983 now abandoned, and Ser. No. 492,634, filed May 9, 1983 now abandoned.

BACKGROUND OF THE INVENTION

1. Field of the Invention

The present invention relates to a magnetooptical recording medium which may be used for a magnetooptical memory, magnetic recording, and display element, and which can be read out by magnetooptical effects, such as the magnetic Kerr effect and Faraday effect, and, more particularly, to a magnetic thin film recording medium having improved corrosion resistance.

2. Description of the Prior Art

Heretofore, there have been known various magnetooptical recording mediums, for example, polycrystalline thin films such as MnBi, MnCuBi and the like, amorphous thin films such as GdCo, GdFe, TbFe, DyFe, GdTbFe, TbDyFe and the like, and single crystalline thin films such as G/IG and the like. Such films are disclosed in U.S. Pat. Nos. 4,126,494, issued Nov. 21, 1978, and 4,152,486, issued May 1, 1979.

Among these thin films, the amorphous thin films have been recently regarded as excellent magnetooptical recording mediums, since such thin films of a large area can be produced at about room temperature, signals can be written with a small light-thermal energy at a good writing efficiency, and the written signals can be read out at a good S/N ratio at a high read-out efficiency.

Among the above-mentioned thin films, GdTbFe has a large angle of Kerr rotation and a Curie temperature of about 150° C., so that it is regarded as suitable for a magnetooptical recording medium. The angle of Kerr rotation is defined as stated below. A linearly polarized light incident on a magnetooptical thin film is reflected as an elliptically polarized light. The angle of Kerr rotation is the angle formed by the polarized plane of the incident light and the plane formed with and containing major axes of the resulting elliptical polarized light.

The present inventors have conducted research to improve the angle of Kerr rotation and have found that GdTbFeCo, as disclosed in parent application Ser. No. 491,300, the disclosure of said application Ser. No. 491,300 being expressly incorporated herein by reference, has a sufficient large angle of Kerr rotation and is a satisfactory magnetooptical recording medium capable of being read out with a good S/N ratio.

However, amorphous magnetic materials such as GdTbFe, GdTbFeCo and the like, are known to have a poor corrison resistance. That is, their magnetic characteristics deteriorate in contact with air and moisture, and are finally completely oxidized to become transparent. For this reason, there have been proposed heretofore disk-type recording mediums having a protection layer on the magnetic film and a "gas-sandwiched type" having an inert gas sealed in its internal space, but such devices do not have sufficient corrosion resistance.

SUMMARY OF THE INVENTION

An object of the present invention is to provide an amorphous magnetooptical recording medium having improved corrision resistance without impairing its magnetic characteristics.

According to the present invention, there is provided a magnetooptical medium comprising an amorphous magnetic alloy containing chromium.

In a more preferred aspect the magnetooptical recording medium includes an amorphous magnetic alloy film having an axis of easy magnetization in a direction perpendicular to the film surface. The alloy has a composition represented by general formula I as follows:

$$(GbTbFe)_{1-p}Cr_p \tag{I}$$

wherein $0.001 \leq p \leq 0.3$.

In another preferred aspect the amorphous magnetic alloy has the composition represented by general formual II as follows:

$$[(GdTb)_{1-y}(FeCo)_y]_{1-p}Cr_p \tag{II}$$

wherein $0.5 \leq y \leq 0.9$ and $0.001 \leq p \leq 0.3$.

In a more preferred embodiment a magnetooptical recording medium of the present invention includes an amorphous magnetic alloy film having an axis of easy magnetization in a direction perpendicular to the film surface. This alloy of the invention has a composition represented by the general formual III as follows:

$$[(Gd_{1-z}Tb_z)_{1-y}(Fe)_y]_{1-p}Cr_p \tag{III}$$

wherein $0 < z < 1$; $0.5 \leq y \leq 0.9$ and $0.001 \leq p \leq 0.3$

In yet another more preferred embodiment the alloy of the invention has a composition represented by general formula IV as follows:

$$[(Gd_{1-z}Tb_z)_{1-y}(Fe_{1-x}Co_x)_y]_{1-p}Cr_p \tag{IV}$$

wherein $0 < z < 1$; $0.005 \leq x < 1$; $0.5 \leq y \leq 0.9$ and $0.001 \leq p \leq 0.3$

DESCRIPTION OF THE PREFERRED EMBODIMENTS

Figure 1:
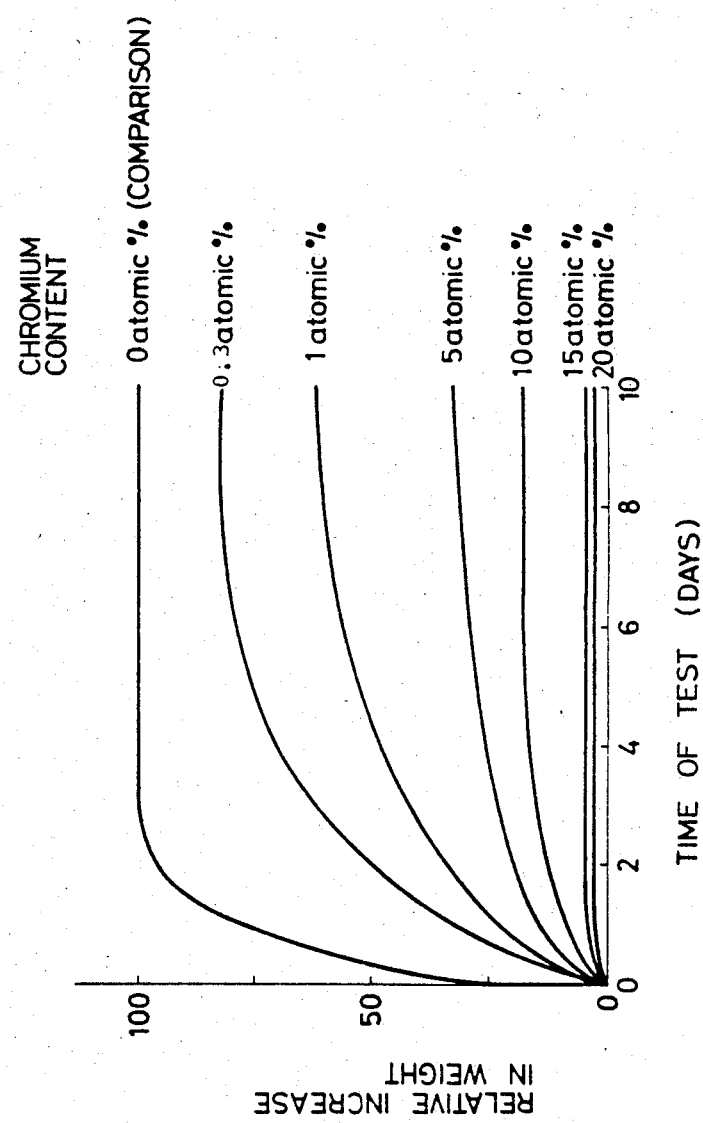
FIG. 1 shows the result of the corrosion test of GdTbFeCr as an example of the magnetooptical recording medium of the present invention.

The present invention improves the corrosion resistance of a magnetooptical recording medium comprising an amorphous magnetic alloy such as GdTbFe, GdTbFeCo and the like be adding chromium thereto. In the magnetooptical recording medium of the present invention, the chromium content in said alloy is preferably in the range of from about 0.1 to 30 atomic % in order to provide corrosion resistance without impairing magnetic characteristics.

In a first embodiment the alloy of the invention has the general formula I or II as follows:

$$(GdTbFe)_{1-p}Cr_p \tag{I}$$

$$[(GdTb)_{1-y}(FeCo)_y]_{1-p}Cr_p \tag{II}$$

wherein $0.5 \leq y \leq 0.9$ and $0.001 \leq p \leq 0.3$.

The proportion of the components Gd, Tb, Fe of the quaternary alloy, $(GdTbFe)_{1-p}Cr_p$ can be varied broadly.

It is preferred that the quaternary alloy have the following composition as set forth in formula III.

$$[(Gd_{1-z}Tb_z)_{1-y}(Fe)_y]_{1-p}Cr_p \qquad (III)$$

wherein $0 < z < 1$; $0.5 \leq y \leq 0.9$ and $0.001 \leq p \leq 0.3$

The proportion of components Gd, Tb, Fe, and Co of the five membered alloy of the invention $[(GdTb)_{1-y}(FeCo)_y]_{1-p}Cr_p$ may vary broadly within the scope of the invention. It is preferred that the five membered alloy have the composition represented by formuala IV as follows:

$$[(Gd_{1-z}Tb)_{1-y}(Fe_{1-x}Co_x)y]_{1-p}Cr_p \qquad (IV)$$

wherein $0 < z < 1$; $0.005 \leq x < 1$; $0.5 \leq y \leq 0.9$ and $0.001 \leq p \leq 0.3$.

Also, the magnetooptical recording medium of the amorphous quaternary alloy and the amorphous five membered alloy of the invention must have sufficient magnetic antisotropy, since the easy magnetizable axis is oriented in the direction perpendicular to the film surface. For this purpose the thin film is required to be formed from an amorphous material and this can be accomplished by forming a thin film according to the sputtering method, the vacuum vapor deposition method or the like. Also, as the composition for imparting sufficient magnetic antisotropy to orient the easy magnetizable axis in the direction perpendicular to the film surface, the atomic weight of Fe or the sum of (Fe and Co) to the sum of (Gd and Tb) may preferably exist in the range from about 50 atomic % to 90 atomic %, and more preferably from about 70 atomic % to 85 atomic % based on a total amount.

Accordingly, for the embodiment of formulae I and II, the weight ratio of Fe to (Gd and Tb) is preferably about 50 to 90 atomic %, more preferably from about 70 to 85 atomic %, while for the embodiment of formulae II and IV the weight ratio of (Fe and Co) to (Gd and Tb) is preferably from about 50 to 90 atomic % and more preferably 70 to 85 atomic %.

Further, in the above magnetooptical recording medium according to the present invention in order to make the angle of Kerr rotation sufficiently greater as compared with the values with the constituent elements of the prior art, Co may desirably exist at an atomic ratio of no less than 0.5 atomic %, preferably 5 to 10 atomic % relative to the sum of Fe and Co, when the atomic ratio of the sum of Fe and Co is made 100%.

EXAMPLE 1

In a high frequency sputtering apparatus, a sheet glass 3 inches square was used as a substrate. An iron plate of 4 inches in diameter on which pieces of Gd and Tb, each 5 mm square, were uniformly placed was used as the first target, and chromium of 4 inches in diameter as the second target. The chamber was evacuated to a pressure of $1.5 \times 10^{-5}$ Pa or below. Then, argon gas was introduced to the pressure of $4 \times 10^{-1}$ Pa, and subsequently the pressure of argon gas in the chamber was adjusted to 3 Pa by operating the main valve on the evacuation line. GdTbFeCr films having the composition shown below were formed on the substrate by simultaneous high frequency sputtering using the targets with application of a constant sputtering power (250W) to the first target and various sputtering powers to the second target.

$[Gd_{0.5}Tb_{0.5})_{0.21}Fe_{0.79}]_{0.95}Cr_{0.05}$ $[Gd_{0.5}Tb_{0.5})_{0.21}Fe_{0.79}]_{0.9}Cr_{0.1}$ $[Gd_{0.5}Tb_{0.5})_{0.21}Fe_{0.79}]_{0.85}Cr_{0.15}$ $[Gd_{0.5}Tb_{0.5})_{0.21}Fe_{0.79}]_{0.8}Cr_{0.2}$

On the iron plate of the first target, small pieces of chromium prepared by cutting a chromium piece 5 mm square were placed uniformly, and GdTbFeCr films having the composition below were formed.

$[Gd_{0.5}Tb_{0.5})_{0.21}Fe_{0.79}]_{0.997}Cr_{0.003}$ $[Gd_{0.5}Tb_{0.5})_{0.21}Fe_{0.79}]_{0.99}Cr_{0.01}$

The GdTbFeCr films of the above-mentioned compositions together with the conventional GdTbFe film were tested for corrosion resistance in a chamber maintained at a temperature of 35° C. and a relative humidty of 90%. The result is shown in FIG. 1, wherein the ordinate shows the increase in weight per unit weight of film relative to the final value of GdTbFe film (comparison), and the abscissa shows the time length of the test (days). The increase in weight shows the degree of corrison. After two or three days, surface corrison (oxidation) was observed in GdTbFe film containing no chromium, whereas in GdTbFeCr films, the more the chromium content, the less is the weight increase i.e. the degree of oxidation. In other words, the corrison resistance of the film was improved. No change in magnetic characteristics (covercive force) was observed.

The GdTbFeCr film containing 30 atomic % or more of chromium did not have an axis of easy magnetization perpendicular to the film surface.

EXAMPLE 2

In a high frequency sputtering apparatus, a sheet glass 3 inches square was used as a substrate. An iron plate of 4 inches in diameter on which pieces of Gd, Tb and Co, each 5 mm square, were uniformly placed was used as the first target, and a chromium plate of 4 inches in diameter as the second target. The GdTbFeCoCr films having the composition shown below were formed in the same manner as in EXAMPLE 1.

$[Gd_{0.5}Tb_{0.5})_{0.21}(Fe_{0.9}Co_{0.1})_{0.79}]_{0.95}Cr_{0.05}$ $[Gd_{0.5}Tb_{0.5})_{0.21}(Fe_{0.9}Co_{0.1})_{0.79}]_{0.9}Cr_{0.1}$ $[Gd_{0.5}Tb_{0.5})_{0.21}(Fe_{0.9}Co_{0.1})_{0.79}]_{0.85}Cr_{0.15}$ $[Gd_{0.5}Tb_{0.5})_{0.21}(Fe_{0.9}Co_{0.1})_{0.79}]_{0.8}Cr_{0.2}$

Another target was prepared by placing uniformly on an iron plate of the above-mentioned first target, pieces of Gc, Tb and Co, each 5 mm square, and small pieces of chromium which had been prepared by cutting chromium pieces of 5 mm square. The sputtering was carried out in the same manner as Example 1 except that the single target was used. The GdTbFeCoCr films having the composition shown below were formed.

$[Gd_{0.5}Tb_{0.5})_{0.21}(Fe_{0.9}Co_{0.1})_{0.79}]_{0.99}Cr_{0.05}$ $[Gd_{0.5}Tb_{0.5})_{0.21}(Fe_{0.9}Co_{0.1})_{0.79}]_{0.997}Cr_{0.003}$

GdTbFeCoCr films containing 30 atomic % or more of chromium had not the axis of easy magnetization perpendilar to the film surface.

The above-mentioned GdTbFeCoCr films and conventional GdTbFeCo films were tested for corrosion resistance in the same manner as in Example 1. The surface of GdTbFeCo films was corroded in 4-5 days, whereas GdTbFeCoCr had tendency similar to that in FIG. 1, the corrosion resistance being improved with the increase of the chromium content.

A sheet glass was used as a substrate in the above-mentioned examples, but metal, plastics or the like can be used in place of a sheet glass. The magnetic film maybe formed on the substrate by vacuum vapor deposition instead of sputtering.

The corrosion resistance is further improved when well-known protection layer, or an antireflection or heat-insulation layer serving simultaneously as a protection layer is formed on the magnetic film of the magnetooptical medium as is shown in the examples. The corrosion resistance is improved also with a "gas-sandwiched type", having an inert gas sealed in its internal space.

Moreover, in the present invention, the addition of other elements such as silicon amd aluminum along with chromium to a conventional amorphous magnetic material yields magnetooptical recording mediums having a still better corrosion resistance, wherein the total content of chromium and silicon, or chromium and aluminum is preferably in the range of from 0.1 to 30 atomic %.

The preparatory of a quaternary alloy excellent in thermal stability, acceptable in angle of Kerr rotation and capable of being read out at a good S-N ration with somewhat enhanced corrosion resistance has the formula GdTbFeCo as disclosed in parent application Ser. No. 491,300. The preparation techniques for such alloys are employable in the present invention. Preparation Examples 1-12 follow which illustrate alloy preparation techniques useful herein.

PREPARATION EXAMPLE 1

In a high frequency sputtering device, a plate glass of 3 inch square was used as the substrate and a target having chips of Gd, Tb and Co each of 5 mm square arranged uniformly on Fe of 4 inch in diameter was employed. After evacuating the chamber to a vacuum of $1.15 \times 10^{-5}$ Pa or less, Ar gas was introduced to $4 \times 10^{-1}$ Pa, and by oprating the main valve of the vacuum evacuation system, Ar pressure was incresed to 3 Pa. Film formation was conducted at a sputtering power of 200 W from a high frequency power source. The thus prepared film with a thickness of 1500 Å was found to have an easy magnetizable axis in the direction perpendicular to the film surface and it was also found to be amorphous by X-ray analysis. Analysis of the composition gave the result that the magnetic film consisted of $(Gb_{0.5}Tb_{0.5})_{0.21}(Fe_{0.95}Co_{0.05})_{0.79}$, and the angle of Kerr rotation as measured by He-NE laser at an oscillated wavelength of 633 nm was 0.37 degree, which was greater by about 30% than the value of the angle of Kerr rotation of $(Gd_{0.5}Tb_{0.5})_{0.21}Fe_{0.79}$ prepared in the same manner as described above.

PREPARATION EXAMPLES 2-5

Preparation Example 1 was repeated except that the amount of Co on the Fe target was varied. The compositions of Preparation Examples 2 to 5 and the angles of Kerr rotation of these Examples are given in Table 2.

TABLE 1

| Example | Composition | Angle of Kerr rotation (degree) |
|---|---|---|
| 2 | $(Gd_{0.5}Tb_{0.5})_{0.21}(Fe_{0.9}Co_{0.1})_{0.79}$ | 0.39 |
| 3 | $(Gd_{0.5}Tb_{0.5})_{0.21}(Fe_{0.85}Co_{0.15})_{0.79}$ | 0.42 |
| 4 | $(Gd_{0.5}Tb_{0.5})_{0.21}(Fe_{0.7}Co_{0.3})_{0.79}$ | 0.42 |
| 5 | $(Gd_{0.5}Tb_{0.5})_{0.21}(Fe_{0.6}Co_{0.4})_{0.79}$ | 0.37 |

By varying the Co content relative to Fe, there can be obtained magnetic films having different values of the angle of Kerr rotation, and all of those angles of Kerr rotation were found to be sufficiently greater than the value of the magnetic film of the prior art.

PREPARATION EXAMPLES 6-12

Preparation Example 1 was repeated except that the contents of Gd, Tb and Co on the Fe target were varied. The compositions of Preparation Examples 6-12 and the angles of Kerr rotation of these Examples are shown in Table 3.

TABLE 2

| Example | Composition | Angle of Kerr rotation (degree) |
|---|---|---|
| 6 | $(Gd_{0.5}Tb_{0.5})_{0.17}(Fe_{0.9}Co_{0.1})_{0.83}$ | 0.35 |
| 7 | $(Gd_{0.5}Tb_{0.5})_{0.25}(Fe_{0.9}Co_{0.1})_{0.75}$ | 0.40 |
| 8 | $(Gd_{0.5}Tb_{0.5})_{0.29}(Fe_{0.9}Co_{0.1})_{0.71}$ | 0.35 |
| 9 | $(Gd_{0.2}Tb_{0.8})_{0.21}(Fe_{0.9}Co_{0.1})_{0.79}$ | 0.38 |
| 10 | $(Gd_{0.4}Tb_{0.6})_{0.21}(Fe_{0.9}Co_{0.1})_{0.79}$ | 0.39 |
| 11 | $(Gd_{0.6}Tb_{0.4})_{0.21}(Fe_{0.9}Co_{0.1})_{0.79}$ | 0.39 |
| 12 | $(Gd_{0.8}Tb_{0.2})_{0.21}(Fe_{0.9}Co_{0.1})_{0.79}$ | 0.38 |

In the magnetooptical recording medium of the present invention, Si can be added in amounts from 0.1 to 30 atomic percent to further enhance corrosion resistance. The following Examples illustrate this embodiment. These examples are hypothetical.

EXAMPLE 3

In a high frequency sputtering device, a plate glass of 3 inch square is used as the substrate and a first target having chips of Cr, Gd, Tb and Co each of 5 mm square arranged uniformly on Fe of 4 inch in diameter and a second target composed of Si of 4 inch in diameter is employed. After evacuating the chamber to a vacuum of $1.5 \times 10^{-5}$ Pa or less, Ar gas is introduced to $4 \times 10^{-1}$ Pa, and by operating the main valve of the vacuum evacuation system, Ar pressure was increased to 3 Pa. From a high frequency source, the sputtering power on the first target is made constant at 250 W, while the sputtering power is varied on the second target, and GdTbFeCoCrSi films having various compositions as shown below are prepared by simultaneous sputtering of the two sources.

$[Gd_{0.5}Tb_{0.5})_{0.21}(Fe_{0.9}Co_{0.1})_{0.79}]_{0.90}Si_{0.05}Cr_{0.05}$ $[Gd_{0.5}Tb_{0.5})_{0.21}(Fe_{0.9}Co_{0.1})_{0.79}]_{0.85}Si_{0.10}Cr_{0.05}$ $[Gd_{0.5}Tb_{0.5})_{0.21}(Fe_{0.9}Co_{0.1})_{0.79}]_{0.75}Si_{0.15}Cr_{0.10}$ $[Gd_{0.5}Tb_{0.5})_{0.21}(Fe_{0.9}Co_{0.1})_{0.79}]_{0.8}Si_{0.10}Cr_{0.10}$

Also, on the above first target of Fe, Si chips cut into small chips of 5 mm square are uniformly disposed, and the GdTbFeCoCrSi films having the following compositions are prepared according to the procedure as described above.

$[Gd_{0.5}Tb_{0.5})_{0.21}(Fe_{0.9}Co_{0.1})_{0.79}]_{0.98}Si_{0.01}Cr_{0.01}$ $[Gd_{0.5}Tb_{0.5})_{0.21}(Fe_{0.9}Co_{0.1})_{0.79}]_{0.996}Si_{0.003}Cr_{0.001}$

Among the above GdTbFeCoCrSi films, the film containing 30 atomic % or more of Si is a magnetic film having no easy magnetizable axis in the direction perpendicular to the film surface.

EXAMPLE 4

In a high frequency sputtering device, a plate glass of 3 inch square is used as the substrate and a first target having chips of Cr, Gd, Tb each of 5 mm square disposed uniformly on Fe of 4 inch in diameter and a second target composed of Si of 4 inch in diameter is employed; or alternatively on the first target of Fe, there are disposed uniformly chips of Cr, Gd, Tb each of 5 mm square and Si chips of 5 mm square. And, following the same process as described in Example 3, GdTbFeCrSi films having the following compositions are prepared.

$[Gd_{0.5}Tb_{0.5})_{0.21}Fe_{0.79}]_{0.995}Si_{0.003}Cr_{0.002}$ $[Gd_{0.5}Tb_{0.5})_{0.21}Fe_{0.79}]_{0.90}Si_{0.01}Cr_{0.09}$ $[Gd_{0.5}Tb_{0.5})_{0.21}Fe_{0.79}]_{0.80}Si_{0.05}Cr_{0.15}$ $[Gd_{0.5}Tb_{0.5})_{0.21}Fe_{0.79}]_{0.89}Si_{0.1}Cr_{0.01}$ $[Gd_{0.5}Tb_{0.5})_{0.21}Fe_{0.79}]_{0.80}Si_{0.15}Cr_{0.5}$ $[Gd_{0.5}Tb_{0.5})_{0.21}Fe_{0.79}]_{0.75}Si_{0.2}Cr_{0.05}$

The GdTbFeCrSi having the above constitutions is placed in a thermostatic and humidistatic at 35° C., 90% for corrosion resistance tests.

Among the GdTbFeCrSi films, the film containing 30 atomic % or more of Si is found to be a magnetic film having no easy magnetizable axis in the direction perpendicular to the film surface.

What is claimed is:

1. A magnetooptical recording medium which comprises an amorphous magnetic alloy film having an axis of easy magnetization in a direction perpendicular to the film surface, said alloy having a composition represented by the general formula IV as follows:

$$[(Gd_{1-z}Tb_z)_{1-y}(Fe_{1-x}Co_x)_y]_{1-p}Cr_p \qquad (IV)$$

wherein $0<z<1$; $0.005 \leq x1$; $0.5 \leq y \leq 0.9$ and $0.001 \leq p \leq 0.3$.

2. A magnetooptical recording medium which comprises an amorphous magnetooptical alloy film having an axis of easy magnetization in a direction perpendicular to the film surface, said alloy having a composition represented by the general formula II as follows:

$$(GdTbFe)_{1-(p+q)}Cr_pSi_q \qquad (II)$$

wherein $p \geq 0.001$, $q \geq 0.001$ and $(p+q) \leq 0.3$.

3. A magnetooptical recording medium which comprises an amorphous magnetooptical alloy film having an axis of easy magnetization in a direction perpendicular to the film surface, said alloy having a composition represented by the general formula III as follows:

$$[(GdTb)_{1-y}(FeCo)_y]_{1-(p+q)}Cr_pSi_q$$

wherein $0.5 \leq y \leq 0.9$, $p \geq 0.001$, $q \geq 0.001$ and $(p+q) \leq 0.3$.

4. A magnetooptical recording medium which comprises an amorphous mgnetooptical alloy film having an axis of easy magnetication in a direction perpendicular to the film surface, said alloy having a composition represented by the general formula II as follows:

$$(GdTbFe)_{1-(p+q)}Cr_pAl_q \qquad (II)$$

wherein $p \geq 0.001$, $q \geq 0.001$ and $(p+q) \leq 0.3$.

5. A magnetooptical recording medium which comprises an amorphous magnetooptical alloy film having an axis of easy magnetization in a direction perpendicular to the film surface, said alloy having a composition represented by the general formula III as follows:

$$[(GdTb_{1-y}(FeCo)_y]_{1-(p+q)}Cr_pAl_q \qquad (III)$$

wherein $0.5 \leq y \leq 0.9$, $p \geq 0.001$, $q \geq 0.001$ and $(p+q) \leq 0.3$.

* * * * *

UNITED STATES PATENT AND TRADEMARK OFFICE
CERTIFICATE OF CORRECTION

PATENT NO. : 4,693,943  Page 1 of 4
DATED : September 15, 1987
INVENTOR(S) : HIROYOSHI KISHI, ET AL.

It is certified that error appears in the above-identified patent and that said Letters Patent is hereby corrected as shown below:

On the title page

AT [63]

"Ser. No. 491,300, May 1, 1983," should read --Ser. No. 491,300, May 3, 1983,--.

AT [57] IN THE ABSTRACT

"p>0.001," should read --$p \geq 0.001$,--.

COLUMN 1

Line 27, "G/IG" should read --GIG--.
Line 55, "sufficient" should read --sufficiently--.

COLUMN 2

Line 8, "magnetooptical medium" should read --magnetooptical recording medium--.
Line 21, "mual" should read --mula--.
Line 31, "formual" should read --formula--.
Line 34, "<0.3" should read --$\leq 0.3$.--
Line 43, "<0.3" should read --$\leq 0.3$.--
Line 55, "be" should read --by--.

COLUMN 3

Line 2, "(GdTbFe)$_{1-p}$ Cr$_p$" should read --(GdTbFe)$_{1-p}$Cr$_p$--.
Line 9, "<0.3" should read --$\leq 0.3$.--.
Line 11, "five membered" should read --five-membered--.
Line 13, "five membered" should read --five-membered--.

UNITED STATES PATENT AND TRADEMARK OFFICE
CERTIFICATE OF CORRECTION

PATENT NO. : 4,693,943

DATED : September 15, 1987

INVENTOR(S) : HIROYOSHI KISHI, ET AL.

It is certified that error appears in the above-identified patent and that said Letters Patent is hereby corrected as shown below:

COLUMN 3 (continued)

Line 14, "formuala" should read --formula--.
Line 17, "$[(Gd_{1-z}Tb)_{1-y}(Fe_{1-x}Co_x)_y]_{1-p}Cr_p$" should read
--$[(Gd_{1-z}Tb_z)_{1-y}(Fe_{1-x}Co_x)_y]_{1-p}Cr_p$--.

Line 31, "antisotropy" should read --anisotropy--.
Line 24, "antisotropy," should read --anisotropy,--.
Line 39, "II" should read --III--.

COLUMN 4

Line 4, "$[Gd_{0.5}$" should read --$[(Gd_{0.5}$--.
Line 6, "$[Gd_{0.5}$" should read --$[(Gd_{0.5}$--.
Line 8, "$[Gd_{0.5}$" should read --$[(Gd_{0.5}$--.
Line 10, "$[Gd_{0.5}$" should read --$[(Gd_{0.5}$--.
Line 16, "$[Gd_{0.5}$" should read --$[(Gd_{0.5}$--.
Line 18, "$[Gd_{0.5}$" should read --$[(Gd_{0.5}$--.
Line 23, "humidty" should read --humidity--.
Line 32, "increase i.e." should read --increase, i.e.--.
Line 35, "(covercive" should read --(coercive--.
Line 48, "EXAMPLE 1." should read --Example 1.--.
Line 50, "$[Gd_{0.5}$" should read --$[(Gd_{0.5}$--.
Line 52, "$[Gd_{0.5}$" should read --$[(Gd_{0.5}$--.
Line 54, "$[Gd_{0.5}$" should read --$[(Gd_{0.5}$--.
Line 56, "$[Gd_{0.5}$" should read --$[(Gd_{0.5}$--.
Line 60, "Gc," should read --Gd.--.

UNITED STATES PATENT AND TRADEMARK OFFICE
CERTIFICATE OF CORRECTION

PATENT NO. : 4,693,943            Page 3 of 4
DATED : September 15, 1987
INVENTOR(S) : HIROYOSHI KISHI, ET AL.

It is certified that error appears in the above-identified patent and that said Letters Patent is hereby corrected as shown below:

COLUMN 5

Line 1, "[$Gd_{0.5}$" should read --[($Gd_{0.5}$--.
    Line 3, "[$Gd_{0.5}$" should read --[($Gd_{0.5}$--.
    Line 6, "perpendilar" should read --perpendicular--.
    Line 11, "GdTbFeCoCr had" should read --GdTbFeCoCr films had--.
    Line 18, "maybe" should read --may be--.
    Line 29, "amd" should read --and--.
    Line 38, "ration" should read --ratio--.
    Line 53, "oprating" should read --operating--.
    Line 54, "incresed" should read --increased--.
    Line 62, "($Gb_{0.5}$ should read --($Gd_{0.5}$--.
    Line 63, "He-NE" should read --He-Ne--.

COLUMN 6

Line 6, "Table 2." should read --Table 1.--.
    Line 27, "Table 3." should read --Table 2.--.
    Line 63, "[$Gd_{0.5}$" should read --[($Gd_{0.5}$--.
    Line 65, "[$Gd_{0.5}$" should read --[($Gd_{0.5}$--.
    Line 67, "[$Gd_{0.5}$" should read --[($Gd_{0.5}$--.

COLUMN 7

Line 1, "[$Gd_{0.5}$" should read --[($Gd_{0.5}$--.
    Line 9, "[$Gd_{0.5}$" should read --[($Gd_{0.5}$--.
    Line 11, "[$Gd_{0:5}$" should read --[($Gd_{0.5}$--.
    Line 23, "composedof" should read --composed of--.
    Line 30, "[$Gd_{0.5}$" should read --[($Gd_{0.5}$--.
    Line 32, "[$Gd_{0.5}$" should read --[($Gd_{0.5}$--.

UNITED STATES PATENT AND TRADEMARK OFFICE
CERTIFICATE OF CORRECTION

PATENT NO. : 4,693,943

DATED : September 15, 1987

INVENTOR(S) : HIROYOSHI KISHI, ET AL.

It is certified that error appears in the above-identified patent and that said Letters Patent is hereby corrected as shown below:

COLUMN 7 (continued)

Line 34, "[$Gd_{0.5}$" should read --[($Gd_{0.5}$--.
Line 36, "[$Gd_{0.5}$" should read --[($Gd_{0.5}$--.
Line 38, "[$Gd_{0.5}$" should read --[($Gd_{0.5}$--.
Line 40, "[$Gd_{0.5}$" should read --[($Gd_{0.5}$--.
Line 42, "GdTbFeCrSi having" should read --GdTbFeCrSi films having--.

COLUMN 8

Line 9, "$0.005 \leq x1$;" should read --$0.005 \leq x < 1$;--.
Line 26, "$[(GdTb)_{1-y}(FeCo)_y]_{1-(p+q)}Cr_pSi_q$" should read
--$[(GdTb)_{1-y}(FeCo)_y]_{1-(p+q)}Cr_pSi_q$ (III)--.
Line 32, "magnetication" should read --magnetization--.
Line 45, "$[(GdTb_{1-y}(FeCo)_y]_{1-(p+q)}Cr_pAl_q$" should read
--$[(GdTb)_{1-y}(FeCo)_y]_{1-(p+q)}Cr_pAl_q$--.

Signed and Sealed this

Twenty-sixth Day of April, 1988

Attest:

DONALD J. QUIGG

Attesting Officer     Commissioner of Patents and Trademarks